(12) United States Patent
Bhagavan

(10) Patent No.: US 9,779,133 B2
(45) Date of Patent: Oct. 3, 2017

(54) CONTEXTUAL DEBUGGING OF SQL QUERIES IN DATABASE-ACCESSING APPLICATIONS

(71) Applicant: Raghuvira Bhagavan, Bangalore (IN)

(72) Inventor: Raghuvira Bhagavan, Bangalore (IN)

(73) Assignee: SAP SE, Walldorf (DE)

( * ) Notice: Subject to any disclaimer, the term of this patent is extended or adjusted under 35 U.S.C. 154(b) by 284 days.

(21) Appl. No.: 14/552,990

(22) Filed: Nov. 25, 2014

(65) Prior Publication Data

US 2016/0147637 A1 May 26, 2016

(51) Int. Cl.
*G06F 9/44* (2006.01)
*G06F 9/45* (2006.01)
*G06F 17/30* (2006.01)
*G06F 11/36* (2006.01)

(52) U.S. Cl.
CPC .... *G06F 17/30424* (2013.01); *G06F 11/3664* (2013.01)

(58) Field of Classification Search
CPC .......... G06F 11/3664; G06F 17/30424; G06F 17/30545; G06F 17/30864; G06F 11/362; G06F 11/3636; G06F 17/30398; G06F 17/30477
See application file for complete search history.

(56) References Cited

U.S. PATENT DOCUMENTS

| | | | | |
|---|---|---|---|---|
| 5,850,550 A | * | 12/1998 | Li | G06F 8/427 717/154 |
| 6,324,683 B1 | * | 11/2001 | Fuh | G06F 11/362 717/124 |
| 6,496,833 B1 | * | 12/2002 | Goldberg | G06F 17/30 707/102 |
| 7,155,426 B2 | * | 12/2006 | Al-Azzawe | G06F 11/3624 |
| 7,203,927 B2 | * | 4/2007 | Al-Azzawe | H04L 67/14 717/124 |

(Continued)

OTHER PUBLICATIONS

M.Y. Chan et al.; Testing Database Applications with SQL Semantics; 1999 CODAS; pp. 363-375; <http://home.cse.ust.hk/faculty/scc/publ/CODAS99.pdf>.*

(Continued)

*Primary Examiner* — Thuy Dao
*Assistant Examiner* — Cuong V Luu
(74) *Attorney, Agent, or Firm* — Schwegman Lundberg & Woessner, P.A.

(57) ABSTRACT

Various embodiments of systems and methods for validating Structured Query Language (SQL) queries in a database-accessing software application during application development are described herein. In some embodiments, an SQL query can be copied, during debugging of the software application, from a program editor used to define the software application into an SQL console that facilitates modifying and executing the query and displays data resulting from the execution of the query. Upon developer validation of the SQL query, the validated query may be copied back into the software application to substitute the original query. The SQL query may include one or more unresolved parameters that can be resolved by the SQL console via access to memory in which the software application is executed during debugging.

16 Claims, 7 Drawing Sheets

(56) References Cited

U.S. PATENT DOCUMENTS

| | | | | |
|---|---|---|---|---|
| 8,443,340 B2* | 5/2013 | Stairs | | G06F 11/362 717/100 |
| 8,996,559 B2* | 3/2015 | Ganti | | G06F 17/30554 707/766 |
| 2003/0066053 A1* | 4/2003 | Al-Azzawe | | G06F 11/3624 717/127 |
| 2005/0097091 A1* | 5/2005 | Ramacher | | G06F 17/30306 |
| 2011/0307870 A1* | 12/2011 | Stairs | | G06F 11/362 717/128 |
| 2013/0191815 A1* | 7/2013 | Davis | | G06F 9/45508 717/129 |
| 2016/0062870 A1* | 3/2016 | Menahem | | G06F 11/362 717/125 |

OTHER PUBLICATIONS

Mohammad R. Azadmanesh; SQL for Deep Dynamic Analysis; 2015 ACM; 6 pages; <http://dl.acm.org/citation.cfm?id=2823365>.*

Pooja Rajan Inamdar; Query Language Framework for Pre-silicon Debug; 2015 IEEE; pp. 605-608; <http://ieeexplore.ieee.org/stamp/stamp.jsp?arnumber=7456956>.*

Mark Pearce; SOL Server Debugging; 2003 Springer; pp. 339-357; <http://babel.ls.fi.upm.es/prole2013/yolanda_garcia.pdf>.*

D. Dillon; ASP NET and SQL Debugging; 2003 Apress; pp. 113-139; <https://link.springer.com/chapter/10.1007/978-1-4302-0760-3_6#page-1>.*

M. Meier; Debugging DB2 CS client server applications; 1997 IBM; pp. 88-101; <http://ieeexplore.ieee.org/stamp/stamp.jsp?arnumber=5387182>.*

* cited by examiner

400

US 9,779,133 B2

CONTEXTUAL DEBUGGING OF SQL QUERIES IN DATABASE-ACCESSING APPLICATIONS

TECHNICAL FIELD

The subject matter described herein relates to approaches for testing and validating Structured Query Language (SQL) queries in a database-accessing software application during application development.

BACKGROUND

An integrated development environment (IDE) is computer software that enables computer programmers to develop other software. An IDE typically includes a source code editor, a compiler, an interpreter, build-automation tools, and a debugger. IDEs that are used for developing object-oriented software may also include a class browser, an object inspector, and a class hierarchy diagram. One example of an IDE that may be used to develop object-oriented software is Eclipse. Generally, Eclipse provides various tools and user interfaces, which are considered to be relatively user-friendly.

A business application may be used to track information that relates to a business by obtaining and integrating finance, sales, materials, and other data. Specialized programming languages have been developed for writing business applications. To access databases storing the business data, the application may incorporate SQL queries (e.g., Open SQL queries, which are compatible with many different databases). The SQL queries tend to become very complex even with only a few tables, and it becomes difficult to validate whether the query is returning the correct result. Conventionally, application developers resort to debugging to ascertain the correctness of the SQL queries. However, in the conventional approach, the debugging process involves the execution of the complete business application, which can involve several steps and long execution time. Further, in order to execute an SQL query, the application developer has to write type definitions and data declarations for the output structure for the query results, into which the output of the queries will be fetched.

BRIEF DESCRIPTION OF THE DRAWINGS

The present disclosure illustrates embodiments of the inventive subject matter by way of example and not limitation, and with reference to the following drawings.

DETAILED DESCRIPTION

Figure 1:
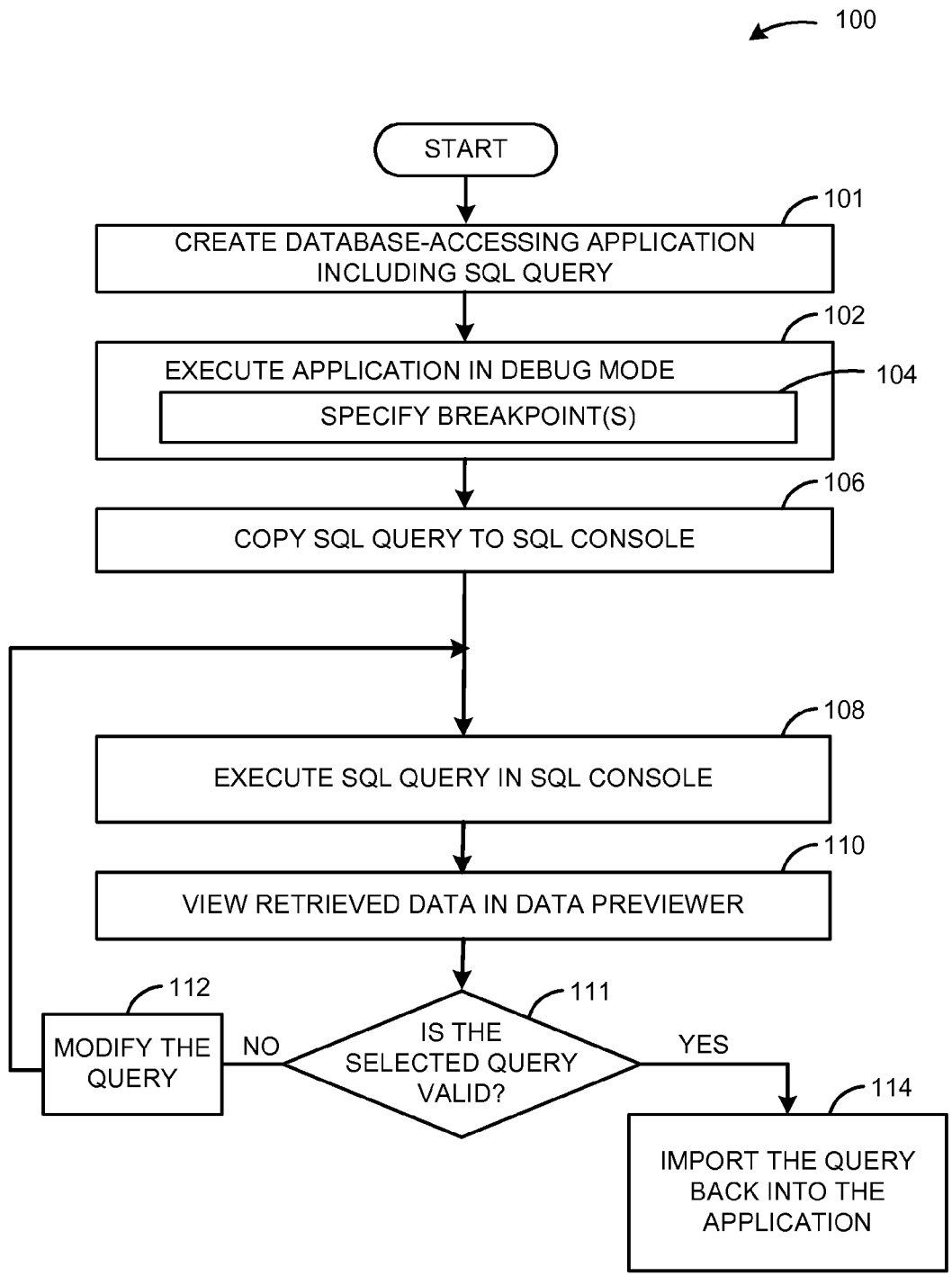
FIG. 1 is a flow chart illustrating, from a developer's perspective, a method for testing an SQL query during debugging of a database-accessing application in accordance with various example embodiments.

The description that follows includes systems, methods, techniques, instruction sequences, and computing machine program products that embody illustrative embodiments of the disclosure. For the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Described herein are example systems and methods for testing and/or validating SQL queries in a database-accessing software application during debugging of the application without the need to re-compile or re-execute the entire program each time the SQL query is modified. The terms "software application" (or sometimes simply "application") and "program" are herein used synonymously, and generally refer to sequences of computer-executable instructions, regardless of whether these instructions are written in a compiled programming language or an interpreted programming language. Example programming languages include ABAP, C, Objective-C, C#, C++, Basic, Pascal, Java, JavaScript, Python, and Ruby. A database-accessing application is generally any program that reads from and/or writes to a database (e.g., using SQL queries) and/or processes data stored in the database; an example of database-accessing applications are database reports, which provide formatted results of database queries that may be used for decision-making and/or analysis.

SQL queries, which include instructions, or "statements," written in SQL (a programming language designed specifically for accessing and manipulating data in relational databases), are often embedded in database reports or other database-accessing applications. (The database-accessing application as a whole is hereinafter also referred to as the "main program," to distinguish it from the SQL queries embedded therein.) SQL queries include, for example, SELECT statements for retrieving specified data from a database, as well as CREATE, UPDATE, and DELETE (or DROP) statements for creating, modifying, or deleting entries or objects in the database. SQL exists in various types, or "flavors," that may differ in the types of databases (e.g., HANA™, Oracle®, MaxDB™, etc.) to which they are suited and/or in certain advanced functionality they provide. Various embodiments hereof employ "Open SQL," an SQL flavor that is independent of the underlying database being queried, allowing the Open SQL queries to have a uniform syntax across different databases. It is to be understood, however, that implementations of the current subject matter are generally not limited to Open SQL, but can employ any suitable type of SQL (depending on the underlying database) or, even more generally, any query language or set of instructions designed for database access.

Consistent with the subject matter disclosed herein, the application development process can be improved by providing developers with a tool for conveniently and efficiently testing, validating, and/or optimizing the logic of SQL queries during the creation and debugging of a database-accessing program. In various embodiments, the developer can, e.g., upon reaching a specified breakpoint during the debugging process, copy an SQL query associated with the breakpoint from the program into an SQL console, where the SQL query can be modified and executed separately from the main program. The SQL console may include an SQL editor for modifying the SQL query and a data previewer for displaying data retrieved from the database in accordance with the query (in the case of a SELECT statement), or database entries as manipulated based on the query (in the case of CREATE, UPDATE, and DELETE statements, for instance). Based on her inspection of the data displayed in the previewer, the developer may iteratively adjust the SQL query until the query yields the desired result. The SQL query thus optimized may then be copied back into the main program to replace the original SQL query (if changes have, indeed, been made), and the debugging process may thereafter be resumed.

Executing the SQL query separately from the program avoids the need to re-compile and/or re-execute the entire program to test each modification to the SQL query, potentially speeding up program development and testing significantly. For example, whereas the execution of a typical, average-size report including thousands of lines of code can take several minutes, the execution of an individual select statement can often be accomplished virtually instantaneously (e.g., in less than one second). Thus, the time needed for query optimization is predominantly productive developer time, with no idle time for a developer awaiting the effect of a modification being tested.

In various embodiments, the testing of SQL queries separately from the main program is not limited to stand-alone queries, but allows SQL queries that include "unresolved parameters" (e.g., parameters whose values are computed or otherwise determined during execution of the main program) to be executed, separately from the main program, in the SQL console. To enable this enhanced functionality, the console resolves the unresolved parameters by accessing memory allocated to the main program, where the parameter values are stored, as needed. (Thus, it is to be understood that the parameter values are unresolved with respect to the SQL query as such, but are, of course, specified or resolved in the context of the application as a whole.) As will be readily appreciated by one of ordinary skill in the art, this capability greatly enhances the scope and permissible complexity of SQL queries amenable to testing with the SQL console (compared with stand-alone queries), rendering the console a much more useful and versatile development tool.

FIG. 1 illustrates, in the form of a flow chart, an example method 100 for creating and debugging a database report (as a concrete example of a database-accessing application), including optimizing an SQL query contained therein, from the developer's perspective. This method 100 can be carried out, for instance, using an IDE such as Eclipse (e.g., as adjusted for use with a specific application programming language), in conjunction with an SQL console as mentioned above and described, by way of example, in more detail below with respect to FIG. 2. Using standard tooling of the IDE, such as a program editor, the developer can create a database report including one or more SQL queries (see operation 101). To test the program, the user may then execute the program in debug mode (see operation 102), specifying (see operation 104) one or more breakpoints (e.g., specific lines within the program) at which program execution halts in order to allow the developer to inspect the values of variables used and/or evaluated in the program up to that point. In accordance with various embodiments, breakpoints may be set at one or more SQL queries of interest.

When a breakpoint associated with an SQL query is reached during execution of the program, the developer may cause the query to be copied from the program editor into the query editor of the SQL console (see operation 106). In principle, the developer may be allowed to select any SQL query preceding the breakpoint; however, to prevent inconsistencies between the value of an unresolved parameter of the SQL query at the time the SQL query is reached during program execution and the value of the parameter at the time the breakpoint is reached, usually only an SQL query at or immediately preceding the breakpoint is selected. In some example embodiments, selection of the SQL query by the developer (e.g., as accomplished by highlighting or clicking on the query) automatically invokes the console and copies the selected query into the console's query editor. In other embodiments, the developer manually launches the console and copies or re-types the SQL query into the query editor.

The developer may then cause execution of the SQL in the SQL console (see operation 108), for instance, by clicking a user-interface element (e.g., a "Run" button) included for that purpose. Execution of the SQL query generally results in data to be fetched from the database and displayed in the data previewer of the console for inspection by the developer (see operation 110). For example, in the case of a SELECT statement, the selected part of the database (such as the data contained in particular columns of a certain table) or, if that data is too much, a portion thereof, may be displayed. In the case of CREATE, UPDATE, or DELETE statements, the newly created, modified, or deleted database portion may be displayed in the data previewer. In some example embodiments, only a certain portion of the data specified in the SQL query, e.g., only the first 100 rows (or, in other embodiments, any number of rows up to 5000 rows) is displayed in order to fit the data on a single screen or at least limit the amount of down-scrolling. In most circumstances, such a portion provides sufficient information for the developer to understand the operation of the SQL query and determine whether it is correct (see operation 111).

Using the SQL console, the developer may validate, improve, or optimize the SQL query by iteratively modifying the query in the query editor (see operation 112), executing it (see operation 108), and viewing the data retrieved or manipulated by the query, as displayed in the data previewer (see operation 110). During this process, the database report (or other main program) remains halted in debug mode, and all of the parameter or variable values previously determined in the main program remain frozen. When the developer is satisfied with the SQL query (e.g., when she has validated the query), she may cause the query to be copied back from the console into the main program (see operation 114) to replace the original query. For example, a user indication of the validity of the query (made, e.g., by pressing a "validate" user-interface element) may initiate automatic substitution of the present query in the console for that in the main program. Alternatively, the user may manually copy or type the validated query in the main program. Control is then returned to the main program editor, where the execution of the database report can be resumed.

Figure 2:
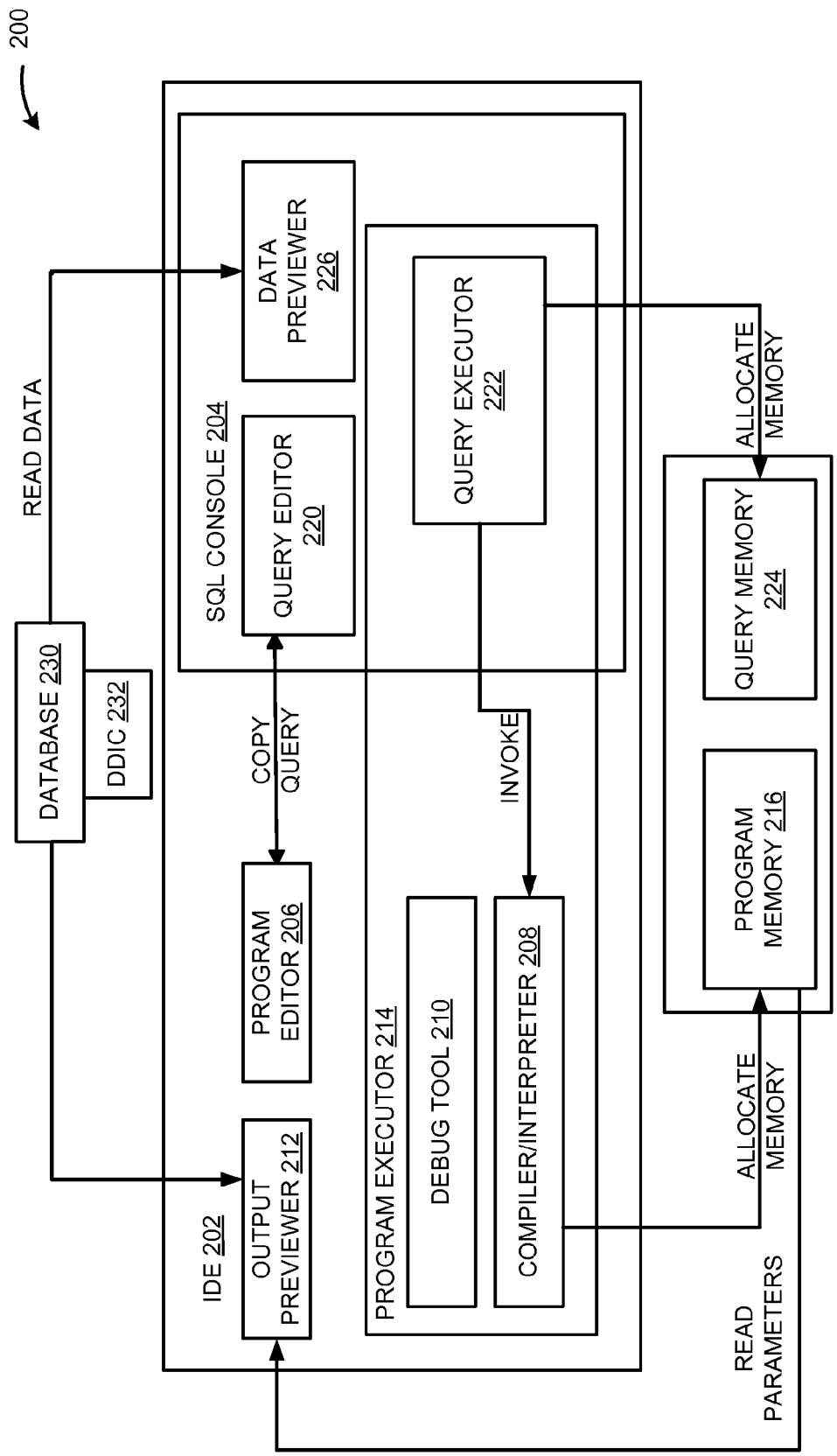
FIG. 2 is a block diagram illustrating an example system facilitating testing of an SQL query during debugging of a database-accessing application in accordance with various example embodiments.

FIG. 2 illustrates, in block-diagram form, a system 200 that facilitates testing and validating an embedded SQL query in the manner described above. The system includes multiple modules that can be implemented in various ways by a suitable combination of hardware and/or software. For example, in some embodiments, the modules are implemented by corresponding software modules executed by one or more computer processors. As shown, the modules may include an IDE 202, which, in turn, may include an SQL console 204. As shown, the SQL console 204 may be integrated into the IDE 202 (e.g., to avoid duplicating overlapping functionality between the two). Alternatively, the SQL console 204 may be provided separately, but communicatively coupled to the IDE 202. In some embodiments, the IDE 202 is conventional but for any modifications needed to integrate the SQL console 204 or facilitate communication therewith.

The IDE 202 may include standard development tools such as a program editor 206 in which source code can be created and modified; a compiler and/or interpreter 208 (depending on the supported programming language(s)) for converting the source code into machine language and executing it; a debug tool 210 for testing the code, optionally in conjunction with an output previewer 212. The program editor 206 may provide advanced functionality such as color-coding of the code (which helps the developer visually distinguish between different elements of a program or different languages used, e.g., by displaying SQL queries in a different color than the regular application code), code syntax checking and error marking (whereby any source code that violates certain syntax rules of the programming language is marked), auto code completion (a "content assist" feature whereby the editor suggests possible completions for initiating strings a user has typed), etc. The debug tool 210 facilitates running the program in a special "debug" mode that allows the developer to monitor program execution in order to identify any errors contained therein. For instance, the developer may set breakpoints (each generally being associated with a particular line of code) at which program execution stops to facilitate inspection of the current values of program parameters/variables and/or of the output resulting from execution of the program up to that point, which may all be displayed in the output previewer 212. The debug tool 210 may employ the compiler/interpreter 208 for program execution; the two components are often integrated with each other in what is herein referred to as the "program executor" 214. For example, in some example embodiments, the program executor 214 is implemented by a Virtual Machine. As illustrated, the program executor 214 accesses a certain memory space 216 allocated for the execution of the program, such as a portion of memory where the instantaneous values of program parameters and variables used and/or determined by the program are stored. To allow the developer to inspect the values in the memory space 216, they may be accessed by and displayed in the output previewer 212; an overview, as displayable in the output previewer 212, of the contents of the memory space 216 when a breakpoint is reached during execution of the program in debug mode is also called a debug stack. In addition to the depicted components, the IDE 202 may include further tools that help developers create new applications and customize and extend existing applications.

The SQL console 204 may include a query editor 220 that facilitates creating and modifying SQL queries; like the program editor 206, the query editor 220 may provide advanced functionality such as color-coding, syntax checking, auto code completion, etc. For example, in some embodiments, the query editor 220 reads a file containing grammar for the SQL query such as a Portable Application Description (PAD) file, which may be generated, e.g., for the SELECT statement syntax. In accordance herewith, the program editor 206 and the query editor 220 of the SQL console 204 are communicatively coupled to allow SQL queries to be copied between the two. In some embodiments, the IDE 202 and SQL console 204 are configured such that, when a breakpoint associated with an SQL query is reached during debugging of a program in the IDE 202, the SQL query is automatically copied into the query editor 220 of the SQL console 204. Conversely, when the developer, after testing the SQL query in the console 204, indicates that the query is valid, the SQL query may automatically be copied back into the program editor 206, generally substituting the original SQL query contained therein at the set breakpoint. Alternatively, the developer may manually copy SQL queries from the program editor 206 to the query editor 220 and vice versa.

The SQL console 204 generally provides functionality for executing an SQL query contained in the query editor 220, conceptually depicted as a "query executor" 222. In some embodiments, the query executor 222 is or includes a dedicated SQL compiler/interpreter. In other embodiments, as shown, query execution is accomplished by the compiler/interpreter 208 of the IDE 202, which is invoked by the query executor 222 as needed. Since the query is executed in the SQL console 204 as a separate program or subroutine (as explained in more detail below with respect to FIG. 3), the compiler/interpreter 208 may allocate memory 224 specifically to the execution of the SQL query (and, as shown, this memory 224 is separate from the memory 216 allocated to the execution of the main program in the IDE 202). The query executor 222 may be responsible for copying parameters that result from (or otherwise depend on) the execution of the main program up to the breakpoint from the memory 216 allocated to the program into the memory 224 reserved for the SQL query execution.

The SQL query, when executed, accesses a database 230, and/or an associated data dictionary (DDIC) 232 storing metadata about the database, to read data therefrom and/or to create, modify, or delete entries therein. The DDIC (as is widely used, e.g., in systems that use database reports to access a database) may centrally describe and manage the data definitions used in the system to avoid redundancies. Using these data definitions, a program can create corresponding objects (e.g., tables or views) from the underlying (relational) database. Whether an SQL query is correct is often reflected in the data it retrieves or otherwise accesses. Accordingly, in order to allow the developer to test and optimize the SQL query using the SQL console 204, the console 204 includes a data previewer 226 in which the retrieved/accessed data are displayed. In the case of a SELECT statement, for example, the data previewer 226 shows the data selected by the statement, or at least a portion thereof (e.g., the first 100 lines). If the displayed data does not comport with the developer's expectations, the developer can modify and re-execute the SQL query until the results are as desired. Similarly, in the case of CREATE, DELETE, or UPDATE statement, or generally whenever the SQL query writes to the database 230, the data previewer may display the database entry or portion written to in order to allow the developer to assess whether the query was correct, e.g., caused the desired change in the database.

Of course, the main program itself accesses the database 230 (and or DDIC 232) when executed in the IDE 202, and the results of such access may be displayed in the output previewer 212. However, testing and optimizing an SQL query via modifications made directly in the program editor 206 may be very time-consuming, as it involves the abortion and re-execution of the program from the start (at least in systems that do not support hot code deployment/replacement (e.g., the ability to implement code changes without flushing the memory in which the program is being executed), which include many legacy systems). Accordingly, by enabling the testing and optimization of SQL queries—which often accounts for a significant fraction of overall development time for a database-accessing software application—separately from the main program, the SQL console 204 can help speed up application development substantially.

Figure 3:
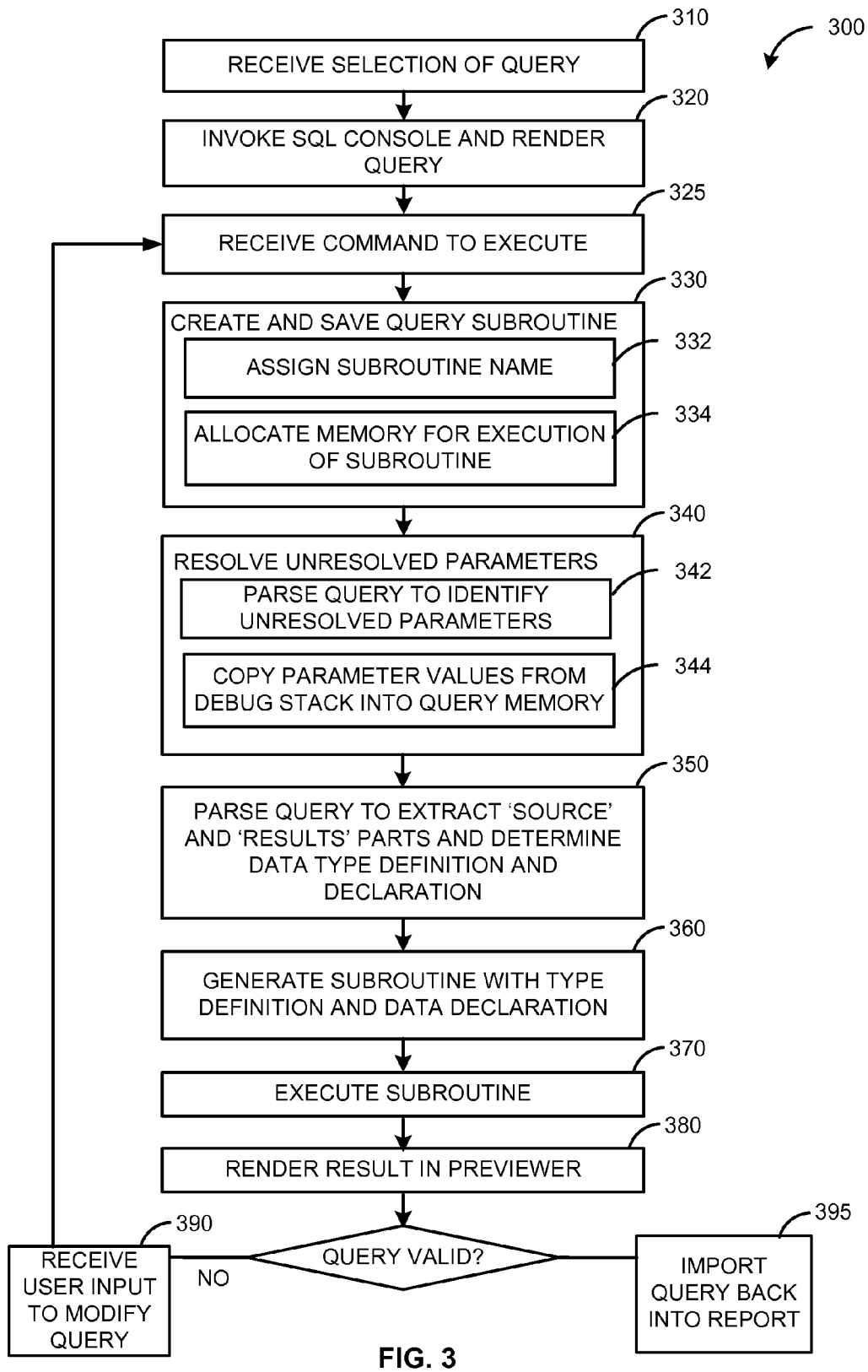
FIG. 3 is a flow chart illustrating operation of the system of FIG. 2 in accordance with various example embodiments.

Refer now to FIG. 3, which illustrates, in the form of a flow chart, a method of operation 300 of the SQL console 204 according to one embodiment. The method 300 involves receiving a selection of a specific SQL query (or set of queries) at operation 310. For example, a user (e.g., a software developer) may select a query or a set of queries from a database ABAP report (or other database-accessing application) to validate the correctness of the report, e.g., to determine whether the selected query returns the expected results. At operation 320, in response to receiving the selection of the specific query, the SQL console 204 is automatically invoked, and the selected query is rendered on the interface, e.g., in the query editor 220. In another embodiment (not illustrated), the user may type/enter/paste a query directly into the query editor 220 of the SQL console 204. The rendered query may be edited/modified in the query editor 220 prior to execution if needed.

The SQL query may be executed by the SQL console 204 upon receiving a command for execution via the user interface at operation 325. For example, a user may select an 'Execute' option on the interface in order to run the query. Alternatively, the query may be automatically executed in console 204 subsequent to receiving a selection of the query in the report. In either case, at operation 330, in response to receiving the execute command via the interface, the query executor 222 of the SQL console 204 creates and saves the SQL query as a separate program or "dynamic subroutine," which involves assigning a subroutine name (at operation 332) and allocating memory to the execution of the subroutine (at operation 334). (The term "dynamic subroutine" as used herein refers to a program that is created during runtime and then executed in the SQL console.)

To illustrate the execution of SQL queries in the SQL console, consider the following example syntax of a SELECT statement (written in Open SQL):

```
SELECT result
    FROM source
    INTO APPENDING target
    [[FOR ALL ENTRIES IN itab] WHERE condition]
    [GROUP BY group] [HAVING group_cond]
    [ORDER BY sort_key]
    ...
    [ENDSELECT]
```

Herein, the "source" part specifies the table (or other database portion) from which data is to be retrieved, the "result" part indicates which data is to be extracted (e.g., a particular column or set of columns from the specified table), and the "target" part specifies a data structure into which the result of the query is to be copied. Typically, a local work space that is type-compatible with the result of the query is declared and used for storing the result of the query. However, using an SQL console 204 in accordance with various embodiments, the user is not required to enter type definitions and data declaration for the result set returned by the query; rather, the data type definitions and data declaration for the result set are automatically generated as discussed further below. In the syntax example above, the phrases in square brackets are optional. The "itab" part following the key word "FOR ALL ENTRIES IN," for instance, may identify specific table entries to be retrieved in terms of their entry keys. For example, when accessing flight data in a table organized by flight identifier (ID) (such as "UA535"), "itab" may be a list of the flight IDs potentially of interest, and the condition may specify further which of these flight IDs are to be selected (e.g., all for a particular air carrier, or with a certain range of numbers).

In accordance herewith, the SQL query may include reference to parameters or variables determined in the database report (or other main program), but not resolved in the query itself. For example, the results part may specify a scalar variable "COL_LIST" that does not correspond to any column or other named portion of the table specified in the source part, but which has a value (e.g., "CONNID CARRID") in the database report identifying a specific table column. As another, more complex example, the "itab" part may reference a variable that is a table itself, with table entries specified in the database report during execution. (The entries may, for instance, result from a computation carried out in the report prior to the SQL statement.) At operation 340, the query executor 222 resolves any such (from the perspective of the SQL query itself) unresolved parameter(s) by parsing the SQL query to identify such unresolved parameter(s) (at operation 342) and then accessing the memory 216 allocated to execution of the program to copy the values of the identified parameter(s) into the memory 224 allocated to execution of the SQL query (at operation 344).

Further, at operation 350, the query executor 222 parses the SQL query to extract a "source" part and a "result" part therefrom, and then automatically determines a data type definition and a data declaration based on the extracted source part and result part. Parsing may involve separating the query into tokens and classifying the tokens into keywords, identifiers, operators, etc., using standard string manipulation functionalities known to those of ordinary skill in the art. At operation 360, the dynamic subroutine is generated with the determined data type definition and data declaration (e.g., replacing the "target" part with the generated data declaration). Since the SQL console 204 automatically derives the data type definition and data declaration for the result of the SQL query, the user is not required to manually generate and enter the type definition and data declaration in the console 204.

In some embodiments, prior to generating the dynamic sub-routine, the source part extracted from the query is parsed to identify the table(s)/view(s) accessed by the query based thereon, and a determination is made whether the user has sufficient authorization to access the identified tables or views. If it is determined that the user does not have the authorization to access the tables/views, then a notification message such as "Insufficient authorization" is displayed, and the execution of the SQL query is stopped. On the other hand, if it is determined that the user has sufficient authorization to access the identified tables/views, then the execution proceeds to the extraction of the result part from the query. Further, in some embodiments, in order to limit the results of the query in the case where the query does not specify a row limit, a 'TOP' part of the query may be replaced with a predefined row limit, or, in the case where the query does not include a 'TOP' part, the query may be appended with a 'TOP' part having a predefined row limit. This and/or other automatic modifications, along with the generated type definition and data declaration, are taken into account when the dynamic subroutine is generated. Further detail regarding the parsing of the SQL query and the generation of the dynamic subroutine can be found in U.S. patent application Ser. No. 14/210,443, filed on Mar. 14, 2014 and entitled "Validating SQL queries in report," which is hereby incorporated herein by reference in its entirety.

At operation 370, the generated dynamic subroutine is executed (e.g., by the compiler/interpreter 208 invoked by the query executor 222). A preview of the result of executing the dynamic subroutine for the selected SQL query is rendered in the data previewer 226 at operation 380. Based on the rendered data, the developer can then validate or modify the query. If the developer determines, upon examining the query result, that the selected query is incorrect or returned unexpected results, he/she may modify the query in the query editor 220. Upon receipt of such user input at operation 390, operations 325-380 are repeated on the modified query until the query is determined to be valid. Upon receipt of an indication from the user that the SQL query is valid, the query may be automatically imported back into the report (at operation 395). In various embodiments, the determined data type definitions are automatically pasted into the report, and the report is rendered executable. Accordingly, after importing the query back into the report, the program developer does not need to make any changes in the report before running it.

The system and method described above may be implemented, e.g., for database-applications written in the Advanced Business Application Programming (ABAP) language developed by SAP SE (headquartered in Walldorf, Germany). SAP provides ABAP application servers for executing ABAP applications, including an ABAP workbench that offers tools for use in developing business applications in ABAP. In order to leverage the usability, speed, and flexibility offered by Eclipse, an IDE called "ABAP in Eclipse" has been developed for ABAP development on an open Eclipse platform. ABAP in Eclipse is a set of ABAP development tools that are designed to combine ABAP application server capabilities with the powerful Eclipse user interface and also provide a modern Eclipse user interface client on top of the ABAP platform. In accordance with various example embodiments, an SQL console 204 is integrated into ABAP in Eclipse to enhance its debugging functionality.

Figure 4:
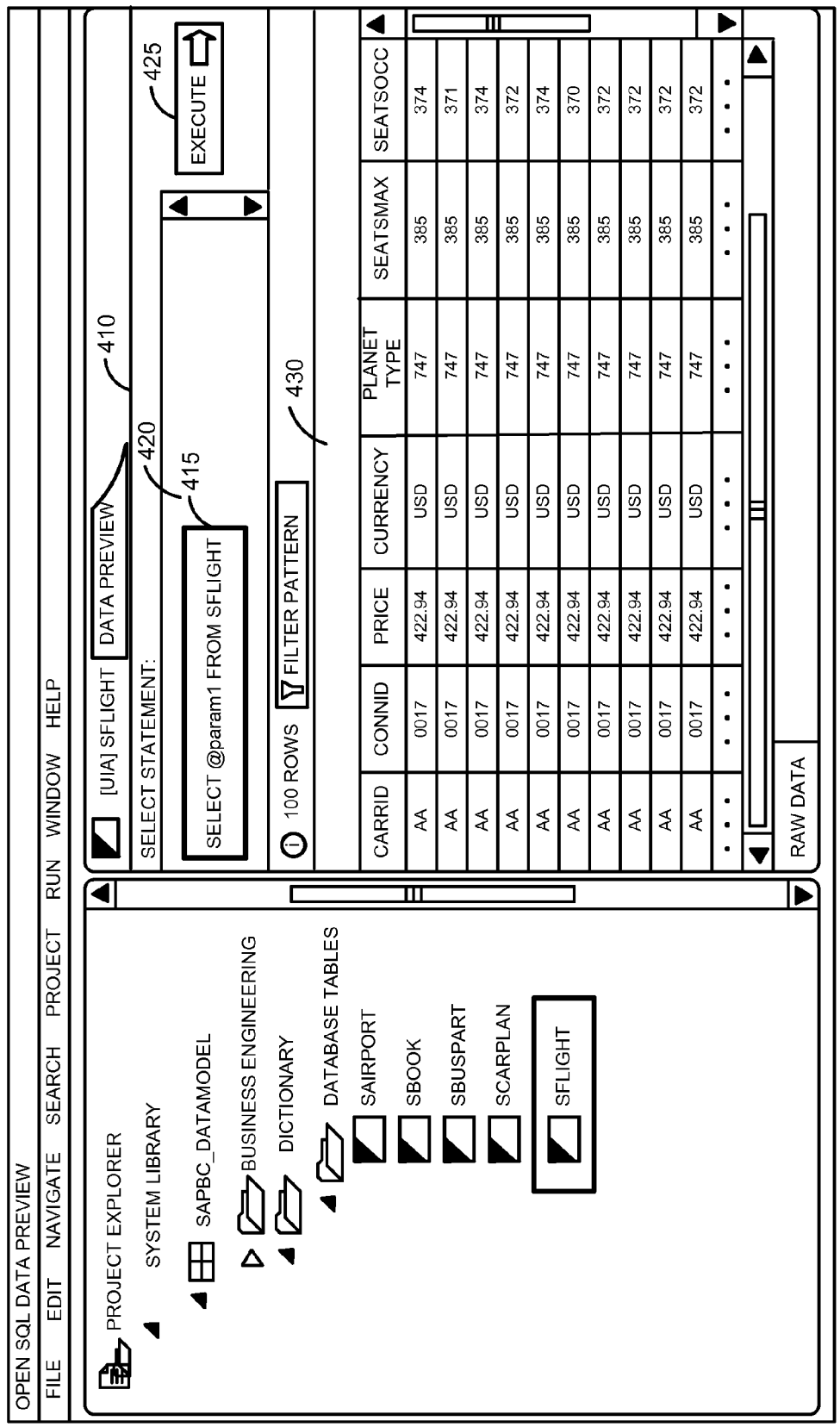
FIGS. 4-6 are example user interfaces of an SQL console used for testing SQL queries in accordance with various example embodiments.
Figure 5:
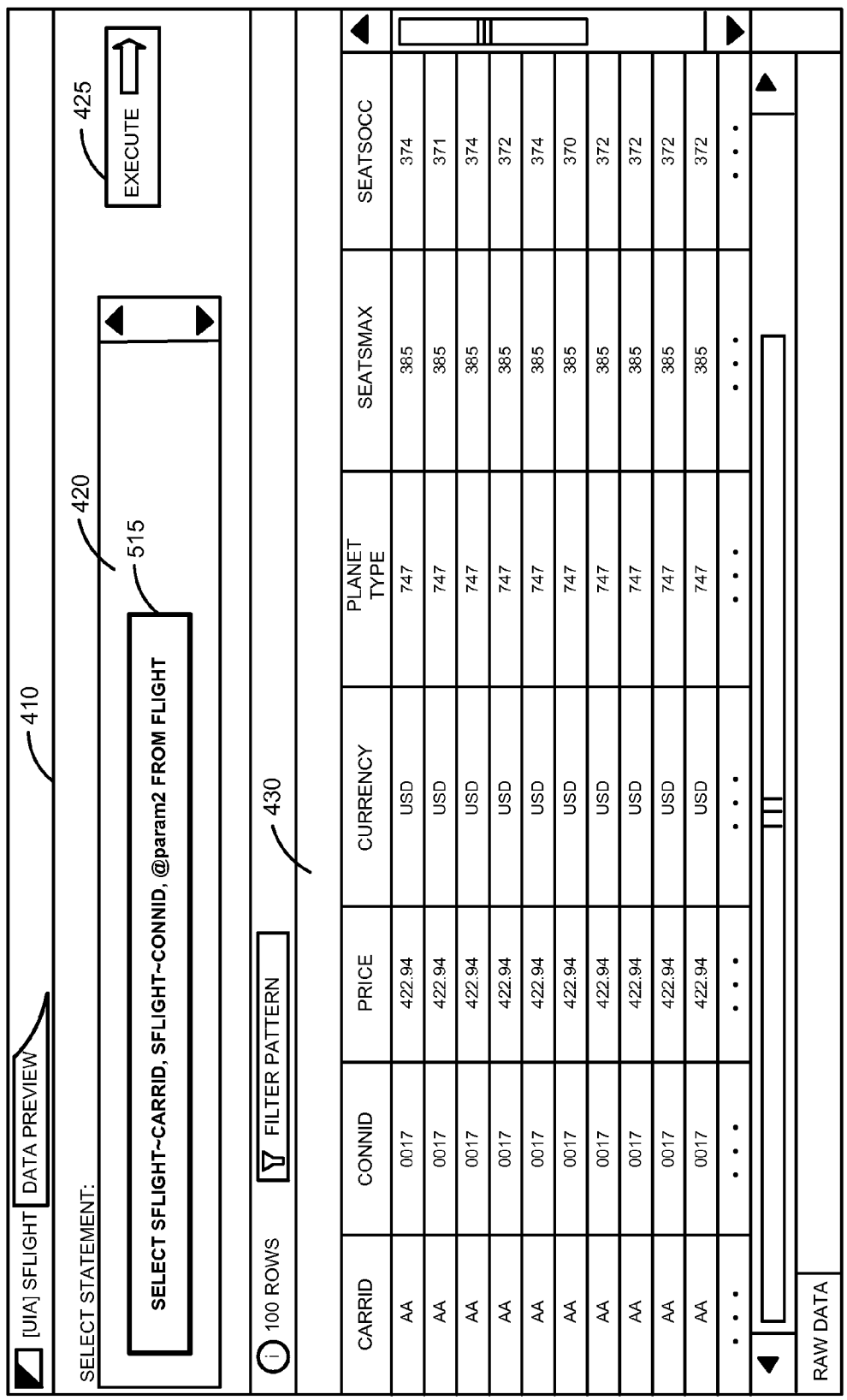
Figure 6:
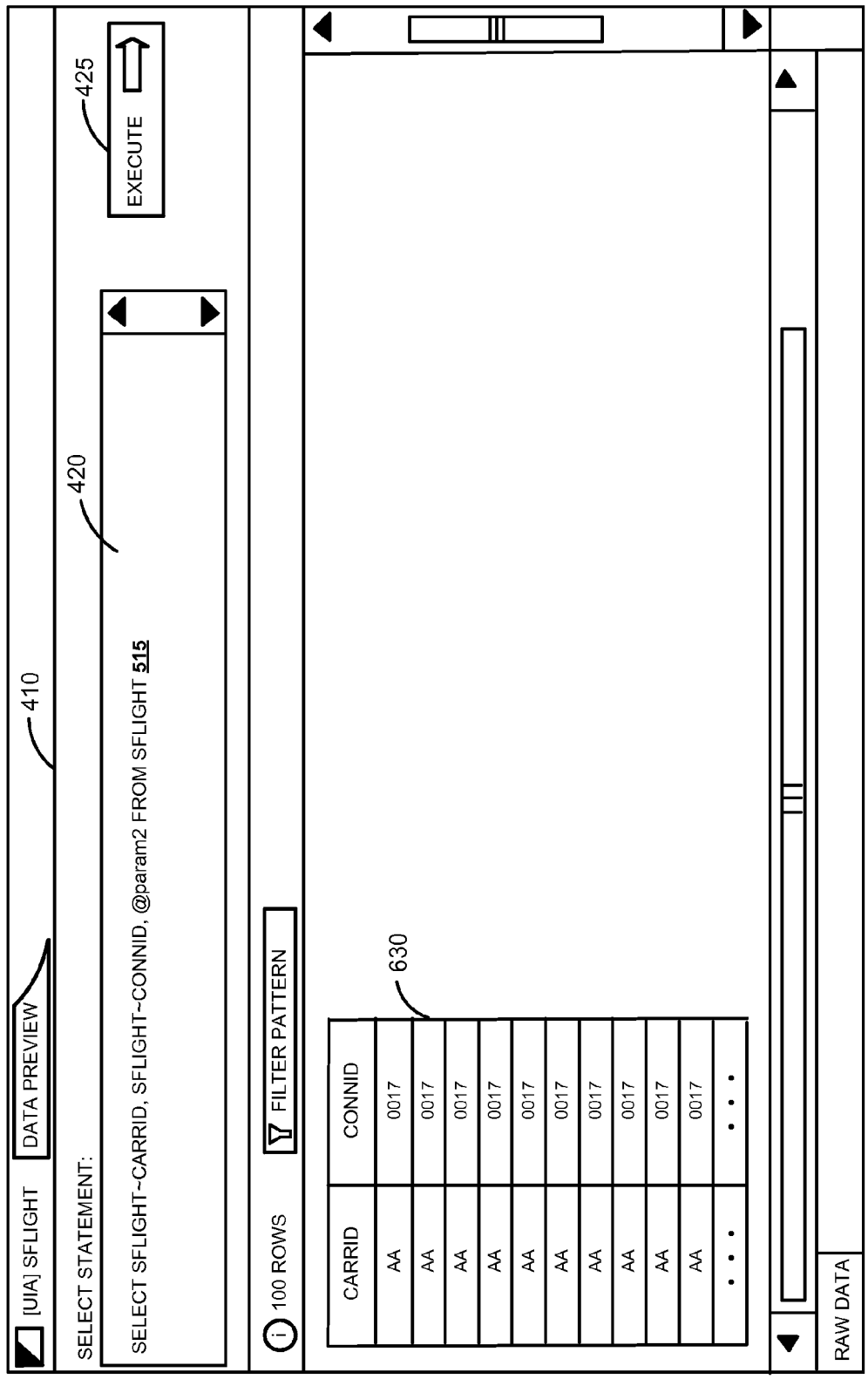

Referring now to FIGS. 4, 5, and 6, example user interfaces of the SQL console 204, as implemented in ABAP in Eclipse, are illustrated. In the depicted example scenario, an ABAP developer is creating an ABAP report containing open SQL queries that access flight data stored in a database. The ABAP developer may want to verify the correctness of a specific query. At this point, executing the complete ABAP report would involve several steps with an execution time spanning several minutes. However, according to the implementations of the current subject matter, the ABAP developer may simply copy the Open SQL query from the ABAP report and paste it into the SQL console 204. Alternatively, as discussed above, the developer may simply select the query and invoke the SQL console 204. In either case, the query is rendered in query editor interface 410, e.g., as displayed at 415 in the text-entry field 420 of the query editor interface 410, as shown in FIG. 4. The developer may then run the query to preview the results of the query. For example, the developer may press an "Execute" option 425 on the interface 410 to preview the results of the query. Note that the ABAP developer does not have to make any changes to the query in the data preview editor to run the query. The selected query is immediately executable as rendered in the editor interface 410. Any data type definition and declaration necessary to run the query is handled internally and transparently by the SQL console 204. Upon execution of the query in the SQL console 204, the results of the query are rendered in the data preview area 430. The ABAP developer may review the results returned by the query and change/tweak/modify/optimize/improve the query, and repeatedly run the query in the console until the query returns the expected results. As shown in the example in FIG. 5, the query 415 (FIG. 4) may be modified to query 515 and executed. The developer may then verify the results 630 (shown in FIG. 6) of the modified query 515 and validate the query. This process may be repeated iteratively until the query returns the results expected by the developer. Once the ABAP developer arrives at the correct query, she may copy the query and paste it back into the ABAP report. After importing the query back into the report, the ABAP developer does not have to make any changes in the ABAP report to run the report. The requisite data types are automatically pasted into the report and the ABAP report is rendered executable. In the example below, copying the query Q1 from the SQL console 204 into the report will automatically render the query Q2 with the requisite data types,

```
select * from [TABLE]                    → Q1
data [ABAP_DATA] type table of [TABLE]   → Q2
select * from [TABLE]
INTO [ABAP_DATA]
```

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower-level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and read-only memory (ROM) and random-access memory (RAM) devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
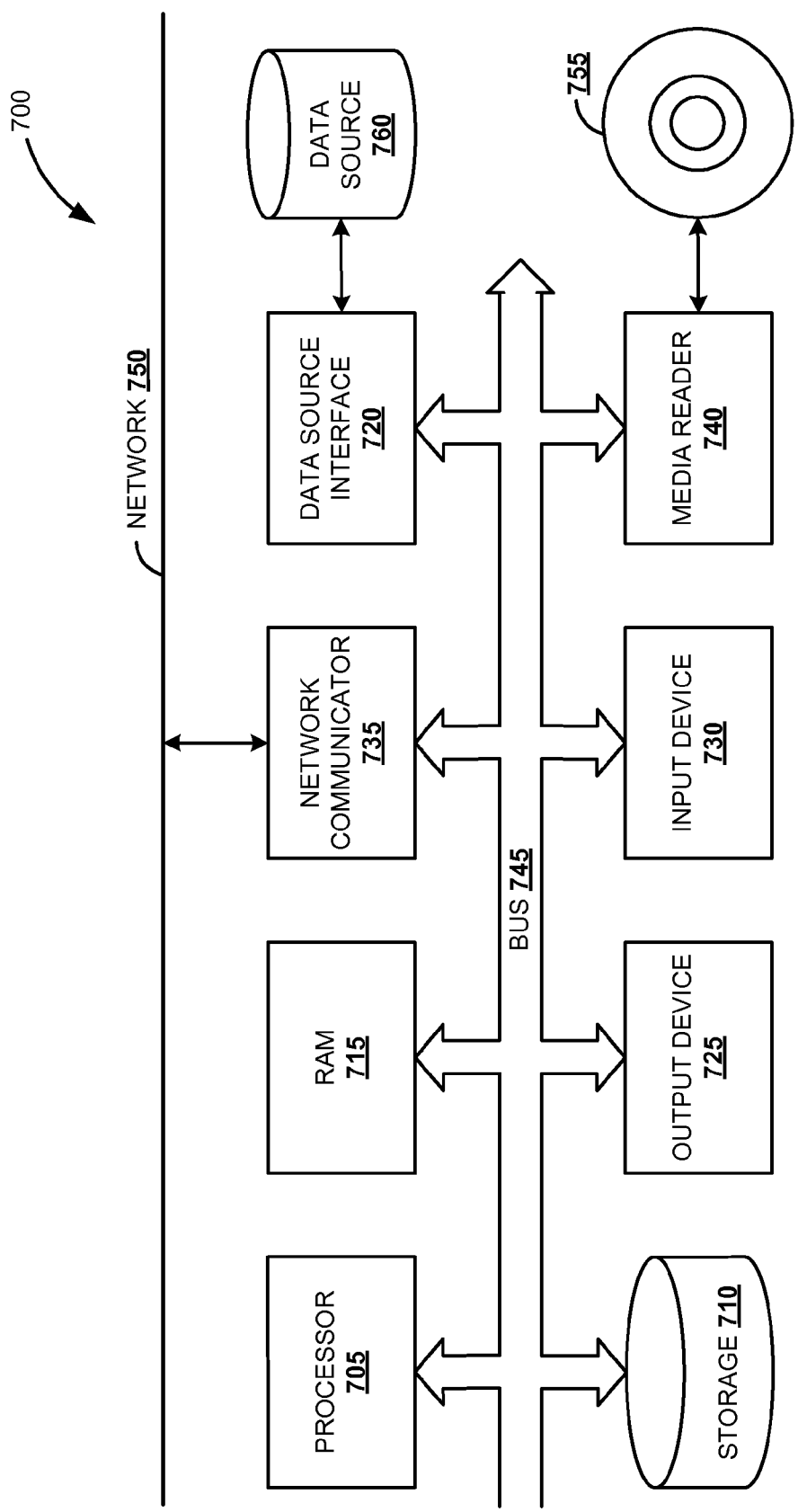
FIG. 7 is a block diagram of an example computer system according to one embodiment.

FIG. 7 is a block diagram of an example computer system 700. The computer system 700 includes a processor 705 that executes software instructions or code stored on a computer readable storage medium 755 to perform the above-illustrated methods. The processor 705 can include a plurality of cores. The computer system 700 includes a media reader 740 to read the instructions from the computer readable storage medium 755 and store the instructions in storage 710 or in RAM 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, the data required for processing may be stored in the RAM 715. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as relational, transactional, hierarchical, multi-dimensional (e.g., OLAP), object-oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open DataBase Connectivity (ODBC), produced by an underlying software system (e.g., ERP system), and the like. Data sources may also include a data source where the data is not tangibly stored or is otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

The above descriptions and illustrations of embodiments, including what is described in the abstract, is not intended to be exhaustive or to limit the embodiments of the disclosed subject matter to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer-implemented method for testing Structured Query Language (SQL) queries in a software application during application development, the method comprising:
   executing, in a debug mode, a database-accessing software application including a main program written in a non-SQL programming language and, embedded in the main program, an SQL query, the debug mode specifying a breakpoint in the main program that is associated with the SQL query, the SQL query comprising at least one unresolved parameter having a value that is unresolved in the SQL query itself and is determinable during execution of the main program;
   copying the SQL query associated with the breakpoint, in response to user selection of the SQL query in a program editor upon reaching the breakpoint, from the program editor into an SQL console; and
   by the SQL console, resolving the at least one unresolved parameter based on the execution of the main program;
   by the SQL console, parsing the SQL query to extract a source part and a result part from the SQL query, and automatically determining a data type definition and data declaration based on the extracted source part and result part and identifying one or more tables accessible by the SQL query based on the source part;

determining that a user has authority to access the one or more tables and, following the determination, causing execution of the SQL query, separately from the execution of the main program, by generating and causing execution of a dynamic subroutine with the determined data type definition and data declaration to thereby retrieve data from a database in accordance with the SQL query; and displaying the retrieved data to the user.

2. The method of claim 1, wherein the SQL query comprises at least one of a select statement, a create statement, a delete statement, or an update statement.

3. The method of claim 1, further comprising modifying the SQL query in response to user input, executing the modified SQL query to thereby retrieve data from the database in accordance with the modified SQL query, and displaying the data retrieved in accordance with the modified SLQ query to the user, wherein the value of the at least one parameter resolved based on the execution of the main program remains frozen during the modification and execution of the SQL query.

4. The method of claim 3, further comprising, upon validation of the modified SQL query by the user, substituting the modified SQL query for the SQL query associated with the breakpoint.

5. The method of claim 1, wherein executing the software application in debug mode comprises computing, during execution of the main program, one or more values of one or more parameters including the at least one unresolved parameter of the SQL query, and storing the computed one or more parameter values in memory allocated to execution of the main program, and wherein resolving the at least one unresolved parameter comprises accessing, by the SQL console, the memory allocated to execution of the main program to retrieve the value of the at least one unresolved parameter therefrom.

6. The method of claim 5, further comprising, by the SQL console, allocating memory to execution of the SQL query and storing the retrieved value of the at least one unresolved parameter therein, the memory allocated to execution of the SQL query being separate from the memory allocated to execution of the main program.

7. The method of claim 1, wherein the breakpoint is placed in the main program or immediately preceding the SQL query.

8. A system for testing Structured Query Language (SQL) queries in a software application during application development, the system comprising:
one or more computer processors; and
one or more machine-readable storage media storing a plurality of instructions for execution by the one or more computer processors, the instructions comprising:
a program editor for defining, via user input, a database-accessing software application including a main program written in a non-SQL programming language and, embedded in the main program, an SQL query comprising at least one unresolved parameter having a value that is unresolved in the SQL query itself and is determinable during execution of the main program;
a program executor to execute the software application in a debug mode specifying a breakpoint in the main program that is associated with the SQL query; and
an SQL console to receive a copy of the SQL query upon user selection of the query in the program editor during execution of the software application in the debug mode, resolve the at least one unresolved parameter based on the execution of the main program, parse the SQL query to extract a source part and a result part from the SQL query, and automatically determine a data type definition and a data declaration based on the extracted source part and result part and identify one or more tables accessible by the SQL query based on the source part;

determine that a user has authority to access the one or more tables and, following the determination, cause execution of the SQL query, separately from the execution of the main program, by generating and causing execution of a dynamic subroutine with the determined data type definition and data declaration to thereby retrieve data from a database in accordance with the SQL query, and display the retrieved data to the user.

9. The system of claim 8, wherein the SQL console comprises a query editor for modifying, in response to user input, the SQL query.

10. The system of claim 8, wherein the SQL console comprises a data previewer for displaying the retrieved data.

11. The system of claim 8, wherein the SQL console comprises a query executor configured to allocate memory to the execution of the SQL query, and to access memory allocated to the execution of the main program to copy therefrom the value of the at least one parameter resulting from the execution of the main program into the memory allocated to the execution of the SQL query, the memory allocated to execution of the SOL query being separate from the memory allocated to execution of the main program.

12. The system of claim 11, wherein the SQL console is further configured to cause execution of the SQL query by the program executor.

13. The system of claim 8, wherein the SQL console is configured, upon validation of the SQL query by the user, to copy the validated SQL query from the SQL console into the software application defined in the program editor.

14. The system of claim 9, wherein the program editor and the program executor are implemented in ASAP in Eclipse.

15. A non-transitory computer-readable medium storing instructions for testing, during execution, in debug mode, of a database-accessing software application comprising a main program written in a non-SQL programming language, a Structured Query Language (SQL) query embedded in the main program and including an unresolved parameter having a value that is unresolved in the SQL query itself and is determinable during execution of the main program, the instructions, when executed by at least one processor, causing the at least one processor to:

copy the SQL query, upon user selection thereof when a debugging breakpoint in the main program that is associated with the SQL query is reached, from a program editor used to define the software application into a query editor;

resolve the unresolved-parameter based on the execution of the main program;

parse the SQL query to extract a source part and a result part from the SQL query, automatically determine a data type definition and data declaration based on the extracted source part and result part and identify one or more tables accessible by the SQL query based on the source part;

determine that a user has authority to access the one or more tables and, following the determination, cause execution of the SQL query, separately from the execution of the main program, by generating and causing execution of a dynamic subroutine with the determined data type definition and data declaration to retrieve data from a database in accordance with the SQL query; and display the retrieved data.

16. The computer-readable medium of claim 15, wherein resolving the parameter comprises copying a value of the parameter from memory allocated to the execution of the main program to separate memory allocated to the execution of the SQL query.

* * * * *